(12) United States Patent
Nagayama (10) Patent No.: US 10,657,428 B2
(45) Date of Patent: May 19, 2020

(54) IMAGE PROCESSING UNIT, IMAGE FORMING APPARATUS, IMAGE PROCESSING METHOD, AND STORAGE MEDIUM

(71) Applicant: Sharp Kabushiki Kaisha, Sakai, Osaka (JP)

(72) Inventor: Katsuhiro Nagayama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 70 days.

(21) Appl. No.: 15/673,449

(22) Filed: Aug. 10, 2017

(65) Prior Publication Data

US 2018/0060710 A1 Mar. 1, 2018

(30) Foreign Application Priority Data

Aug. 31, 2016 (JP) .................. 2016-169051

(51) Int. Cl.
*H04N 1/40* (2006.01)
*G06K 15/02* (2006.01)
*H04N 1/409* (2006.01)
*G03G 15/00* (2006.01)
*G03G 15/01* (2006.01)
*H04N 1/29* (2006.01)

(52) U.S. Cl.
CPC ......... *G06K 15/1843* (2013.01); *G03G 15/01* (2013.01); *G03G 15/5025* (2013.01); *G06K 15/1873* (2013.01); *G06K 15/1874* (2013.01); *H04N 1/29* (2013.01); *H04N 1/40012* (2013.01); *H04N 1/4092* (2013.01); *H04N 2201/0094* (2013.01)

(58) Field of Classification Search
CPC ............ G06K 15/1843; G03G 15/01; G03G 15/5025; H04N 1/29; H04N 1/40012; H04N 1/4092; H04N 2201/0094
USPC ......................... 382/258; 358/447, 443, 448
See application file for complete search history.

(56) References Cited

U.S. PATENT DOCUMENTS

| | | | | |
|---|---|---|---|---|
| 4,996,603 | A * | 2/1991 | Kanemitsu | ......... H04N 1/40062 358/462 |
| 7,602,967 | B2 * | 10/2009 | Lim | ................... G06K 9/00456 382/162 |
| 8,427,704 | B2 * | 4/2013 | Tanaka | ............... H04N 1/40037 358/2.1 |
| 2004/0017579 | A1 * | 1/2004 | Lim | ................... H04N 1/40062 358/1.9 |
| 2009/0214238 | A1 * | 8/2009 | Tanaka | ............... H04N 1/40037 399/51 |
| 2009/0238586 | A1 * | 9/2009 | Nishikawa | ......... G03G 15/0194 399/40 |

(Continued)

FOREIGN PATENT DOCUMENTS

JP 2001-63134 A 3/2001

*Primary Examiner* — Cheukfan Lee
(74) *Attorney, Agent, or Firm* — Keating & Bennett, LLP (57) ABSTRACT

An image processing unit includes a region separation device and a spatial filtering device. The region separation device detects line widths of a manuscript image in which the line widths are different between a vertical line and a horizontal line and determines which of the vertical line or the horizontal line is thinner. The spatial filtering device executes an emphasizing process to make a widening ratio of a thinner line of the vertical line or the horizontal line higher than a widening ratio of the other line.

8 Claims, 4 Drawing Sheets

(56) References Cited

U.S. PATENT DOCUMENTS

| | | | | | |
|---|---|---|---|---|---|
| 2010/0310170 | A1* | 12/2010 | Li | ............................ | G06T 7/13 |
| | | | | | 382/173 |
| 2011/0069326 | A1* | 3/2011 | Oishi | ...................... | G06T 3/403 |
| | | | | | 358/1.2 |
| 2017/0094099 | A1* | 3/2017 | Shibahara | ............ | H04N 1/2369 |
| 2018/0060710 | A1* | 3/2018 | Nagayama | ........... | H04N 1/4092 |

* cited by examiner

IMAGE PROCESSING UNIT, IMAGE FORMING APPARATUS, IMAGE PROCESSING METHOD, AND STORAGE MEDIUM

BACKGROUND

1. Field

The present disclosure relates to an image processing unit, an image forming apparatus, an image processing method, and a storage medium storing a program that perform a process for widening lines of a manuscript image in which line widths are different between a vertical line and a horizontal line.

2. Description of the Related Art

There is a character font such as Ming typefaces in which line widths are different between vertical lines and horizontal lines. Further, ruled lines may be different in line width between vertical lines and horizontal lines. In a case where such a manuscript image in which the line widths are different between the vertical lines and the horizontal lines is formed on paper, reproducibility of thinner lines may be lowered.

An image processing unit in related art has performed a process for thickening a vertical line and a horizontal line uniformly in order to improve the reproducibility of the manuscript image.

Further, in an image forming apparatus of an electrophotographic scheme, regarding the problem in that the vertical line is likely to become thicker than the horizontal line, techniques have been known which attempt to reduce differences between the thickness of the vertical line and the thickness of the horizontal line by reducing the size of print dots of the vertical line (for example, see Japanese Unexamined Patent Application Publication No. 2001-63134).

However, the image processing unit in related art has had a problem in that in order to sufficiently improve the reproducibility of the thinner line of the vertical line or the horizontal line, the other line may become unnecessarily and excessively thick.

Further, in the techniques described in Japanese Unexamined Patent Application Publication No. 2001-63134, the size of the print dots of lines in a prescribed direction in the image forming apparatus is reduced regardless of the thickness of lines of the manuscript image. This leads to a problem in that the thinner line becomes much thinner in a case where the manuscript is set such that the thinner line of the vertical line or the horizontal line coincides with the prescribed direction.

It is desirable to provide an image processing unit, an image forming apparatus, an image processing method, and a storage medium storing a program that may improve reproducibility of a thinner line while widening of a thicker line is restrained.

SUMMARY

An image processing unit of one aspect of the present disclosure includes a line width determination device and an emphasizing processor. The line width determination device detects line widths of a manuscript image in which the line widths are different between a vertical line and a horizontal line and determines which of the vertical line or the horizontal line is thinner. The emphasizing processor executes an emphasizing process to make a widening ratio of a thinner line of the vertical line or the horizontal line higher than a widening ratio of the other line.

An image forming apparatus of another aspect of the present disclosure includes an above-described image processing unit and an image forming unit. The image forming unit has an optical scanning device which scans an image carrier by laser in a first scanning direction to form an electrostatic latent image on a surface of the image carrier and a developing device of a magnetic brush development scheme which supplies a developer to the image carrier to visualize the electrostatic latent image as a toner image and performs an image forming process of an electrophotographic scheme based on image data which are output from the image processing unit. An emphasizing processor executes an emphasizing process in a case where a direction of a thinner line of a vertical line or a horizontal line coincides with the first scanning direction.

An image forming apparatus of another aspect of the present disclosure includes an image reading unit, an above-described image processing unit, and an image forming unit. The image reading unit has at least one of a copied manuscript mode in which a manuscript formed by copying is scanned to generate image data and a printed manuscript mode in which a manuscript formed by printing is scanned to generate image data. The image processing unit executes an emphasizing process for the image data which are generated by the image reading unit. The image forming unit forms an image on paper based on the image data which are output from the image processing unit. An emphasizing processor executes the emphasizing process in a case where the image data are generated by using the copied manuscript mode or the printed manuscript mode in the image reading unit.

An image processing method of another aspect of the present disclosure includes detecting line widths of a manuscript image in which the line widths are different between a vertical line and a horizontal line, determining which of the vertical line or the horizontal line is thinner, and executing an emphasizing process to make a widening ratio of a thinner line of the vertical line or the horizontal line higher than a widening ratio of the other line.

A non-transitory computer readable storage medium storing a program of another aspect of the present disclosure causes an image processing unit to execute detecting line widths of a manuscript image in which the line widths are different between a vertical line and a horizontal line, determining which of the vertical line or the horizontal line is thinner, and executing an emphasizing process to make a widening ratio of a thinner line of the vertical line or the horizontal line higher than a widening ratio of the other line.

DESCRIPTION OF THE EMBODIMENTS

First Embodiment

Figure 1:
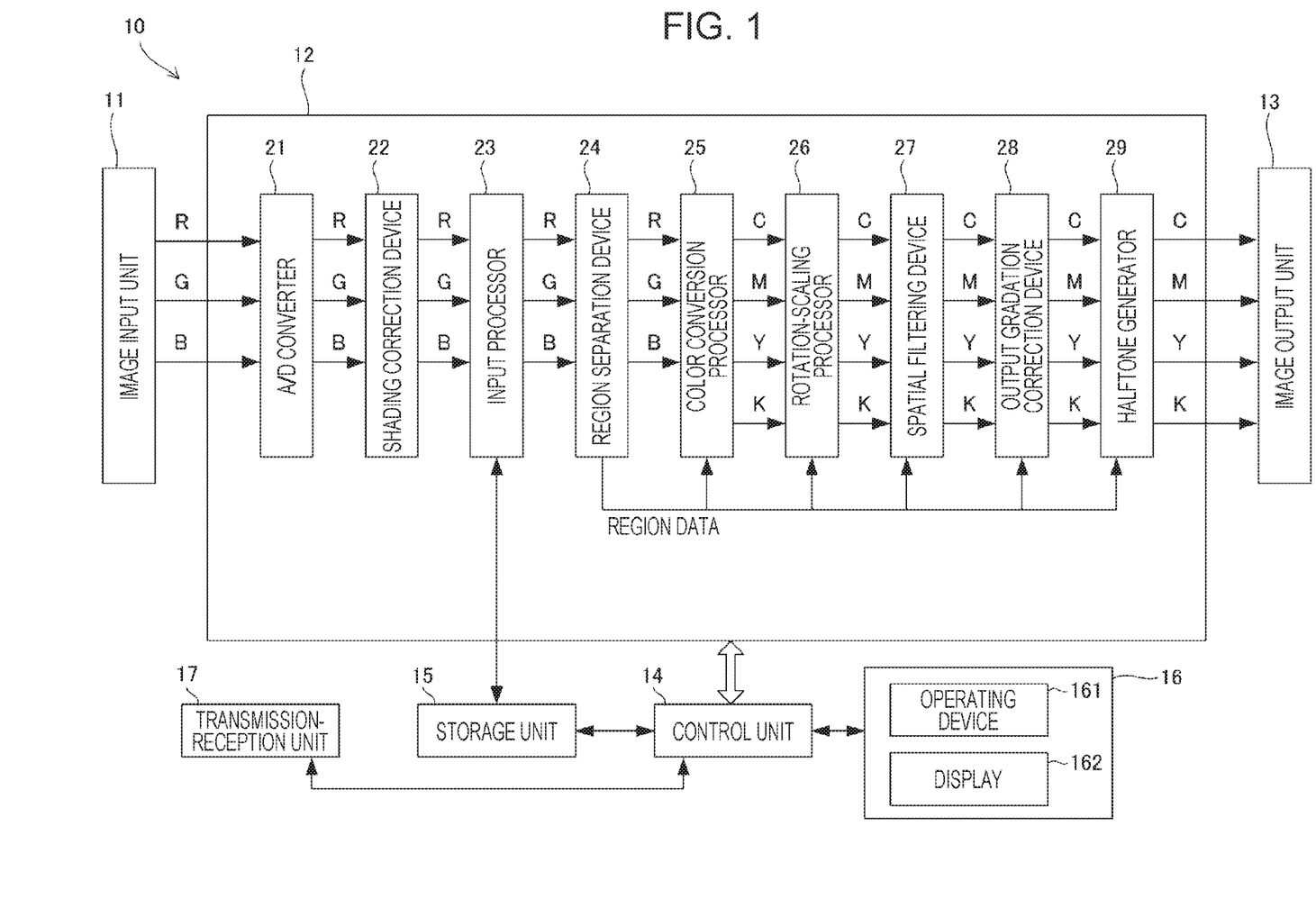
FIG. 1 is a block diagram illustrating a schematic configuration of an image forming apparatus that employs an image processing unit according to a first embodiment of the present disclosure.

As illustrated in FIG. 1, an image forming apparatus 10 that employs an image processing unit 12 according to a first embodiment of the present disclosure includes an image input unit 11, the image processing unit 12, an image output unit 13, a control unit 14, a storage unit 15, an operation display unit 16, and a transmission-reception unit 17. As one example, the image forming apparatus 10 is a multi-function printer that has various action modes such as a copy mode, a printer mode, and a facsimile mode. FIG. 1 illustrates a process in a case where the image forming apparatus 10 acts in the copy mode.

The control unit 14 entirely controls actions of units in the image forming apparatus 10. The operation display unit 16 has an operating device 161 and a display 162. For example, the operating device 161 is a touch panel, the display 162 is a liquid crystal display, and the operation display unit 16 is a liquid crystal touch panel. The transmission-reception unit 17 performs transmission and reception of image data.

The image input unit 11 is a unit that optically reads an image of a manuscript on a manuscript table (not illustrated) and is a scanner that has a charge coupled device (CCD) line sensor, for example. The image input unit 11 corresponds to an image reading unit of the present disclosure. The image input unit 11 emits light to the manuscript, performs color separation of reflected light into red (R), green (G), and blue (B), and converts the light in each of the colors, which results from the color separation, into electric signals. The electric signals will be referred to as RGB analog signals. The RGB analog signals are received by the image processing unit 12.

The image processing unit 12 has an analog-digital converter (hereinafter referred to as an A/D converter) 21, a shading correction device 22, an input processor 23, a region separation device 24, a color conversion processor 25, a rotation-scaling processor 26, a spatial filtering device 27, an output gradation correction device 28, and a halftone generator 29.

The A/D converter 21 converts the RGB analog signals that are transmitted from the image input unit 11 to digital signals and thereby generates image data that are configured with three colors of RGB, that is, RGB image data.

The shading correction device 22 removes various distortions that occur in an illumination section, an image forming section, and an image capturing section of the image input unit 11 from the RGB image data that are generated in the A/D converter 21. In the description made below, an image that is formed on the basis of RGB image data will be referred to as an RGB image, and an image formed on the basis of CMYK image data, which are formed by using four colors of cyan (C), magenta (M), yellow (Y), and black (K), will be referred to as a CMYK image.

The input processor 23 applies γ correction to the RGB image data resulting from the shading correction. The RGB image data resulting from the γ correction are stored in the storage unit 15. The RGB image data stored in the storage unit 15 are managed as filing data by the control unit 14.

When the RGB image data resulting from the γ correction are stored in the storage unit 15, the RGB image data are compressed into JPEG codes based on a JPEG compression algorithm, for example. Further, in a case where image formation is executed in the image output unit 13, the JPEG codes are read out from the storage unit 15, and a decoding process is applied to the JPEG codes. The RGB image data that are generated by the decoding process are output from the input processor 23 to the region separation device 24.

The region separation device 24 determines which of a character region, a figure region, or a photograph region of a manuscript image each pixel of the RGB image is included in. Further, the region separation device 24 identifies vertical lines and horizontal lines of characters or figures, detects the line width of each of the lines, and thereby determines which of the vertical line or the horizontal line is thinner. The figures include ruled lines. Determination results in the region separation device 24 are used as region data that represent a kind of the region, to which each of the pixels belongs, in the color conversion processor 25, the rotation-scaling processor 26, the spatial filtering device 27, the output gradation correction device 28, and the halftone generator 29 in accordance with request.

The color conversion processor 25 performs color conversion process for converting the RGB image data into the CMYK image data and thereby enhances color reproducibility in a case of printing on paper. Examples of the paper include plain paper, cardboard, OHP film, and so forth.

In a case where a rotation process such as 90-degree rotation, horizontal reflection, or vertical reflection is set, the rotation-scaling processor 26 determines which of the vertical line or the horizontal line becomes thinner as a result of the rotation process. Further, in a case where a scaling process is set, the rotation-scaling processor 26 calculates the line width of the thinner line of the vertical line or the horizontal line, which results from application of the scaling process. The region separation device 24 and the rotation-scaling processor 26 correspond to a line width determination device of the present disclosure.

The spatial filtering device 27 applies a spatial filtering process of an emphasizing process or a smoothing process to the CMYK image data. The spatial filtering device 27 corresponds to an emphasizing processor of the present disclosure.

The output gradation correction device 28 applies an output gradation correction process to the CMYK image data such that an output image may have appropriate brightness in a case where the CMYK image is printed on paper.

The halftone generator 29 applies a gradation reproducing process to the CMYK image data by using the region data so as to enhance the gradation reproducibility of an image in each of the regions.

Note that instead of the image data that are generated by optically reading the image of the manuscript in the image input unit 11, the image forming apparatus 10 may apply above-described image processing to image data that are output from the transmission-reception unit 17 in the image processing unit 12. The image data output from the transmission-reception unit 17 include image data that are received through a telephone line in the facsimile mode and image data that are received through an information communication line such as a local area network (LAN) line in the printer mode.

The image output unit 13 applies an image forming process to paper based on the CMYK image data resulting from the processes by the image processing unit 12. As one example, the image output unit 13 is a printer that has an image forming unit which executes an image forming process of an electrophotographic scheme. The image forming unit has an image carrier, a charge device, an optical scanning device, a developing device, a transfer device, and a fixing device. The charge device charges a prescribed electric potential to a surface of the image carrier. The optical scanning device scans the image carrier by laser in a first scanning direction and thereby forms an electrostatic latent image on the surface of the image carrier. The developing device adopts a magnetic brush development scheme, supplies a developer to the surface of the image carrier, and thereby visualizes the electrostatic latent image as a toner image. The transfer device transfers the toner image to paper. The fixing device causes the toner image to adhere onto the paper.

Figure 2:
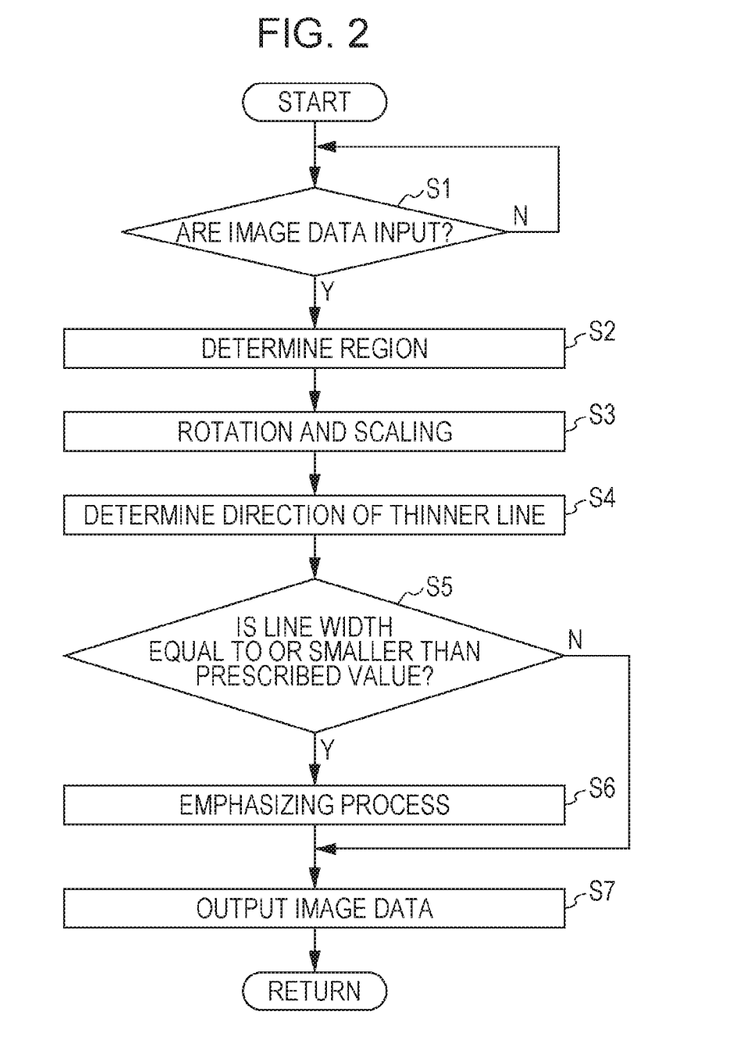
FIG. 2 is a flowchart illustrating a procedure performed by the image processing unit.
Figure 3:
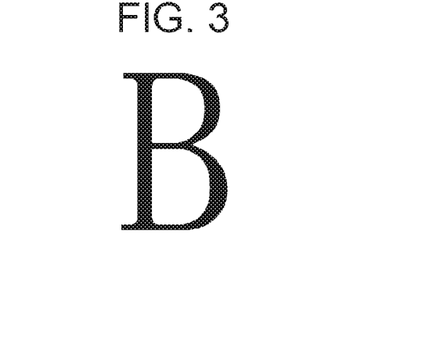
FIG. 3 is a diagram illustrating a character of Ming typefaces as an example of a font of which the line widths are different between vertical lines and horizontal lines.

As illustrated in FIG. 2, in a case where the image data are input (S1), the image processing unit 12 applies a process such as the shading correction to the image data, thereafter determines which of the character region, the figure region, or the photograph region each of the pixels of the manuscript image is included in, identifies the vertical lines and the horizontal lines with respect to characters and figures, detects the line width of each of the lines, and further determines which of the vertical line or the horizontal line is thinner (S2). For example, as illustrated in FIG. 3, in a case of a character of B of Ming typefaces, a determination is made that the horizontal lines are thinner than the vertical lines.

The image processing unit 12 executes the rotation process or the scaling process (S3). In a case where the rotation process is executed, the image processing unit 12 determines which of the vertical line or the horizontal line becomes thinner as a result of the rotation process (S4). Further, in a case where the scaling process is executed, the image processing unit 12 calculates the line width of the thinner line of the vertical line or the horizontal line, which results from application of the scaling process.

In a case where the line width of the thinner line of the vertical line or the horizontal line is equal to or smaller than a prescribed value (S5), the image processing unit 12 executes a prescribed emphasizing process (S6). The emphasizing process is a process for making the widening ratio of the thinner line of the vertical line or the horizontal line higher than the widening ratio of the other line. As one example, the prescribed value corresponds to a line width of three pixels at 600 dpi. Copying a line whose width is equal to or smaller than the line width of the three pixels at 600 dpi may lead to degraded reproducibility such as a loss of a part. Thus, the emphasizing process is applied to such a thin line, and the reproducibility of characters and figures may thereby be improved. Because such a loss due to copying may hardly occur to a thick line, the emphasizing process does not have to be applied to the thick line. Thus, a situation in which excessive thickening unintentionally impair legibility and clearness of characters and figures may be inhibited.

Figure 4:
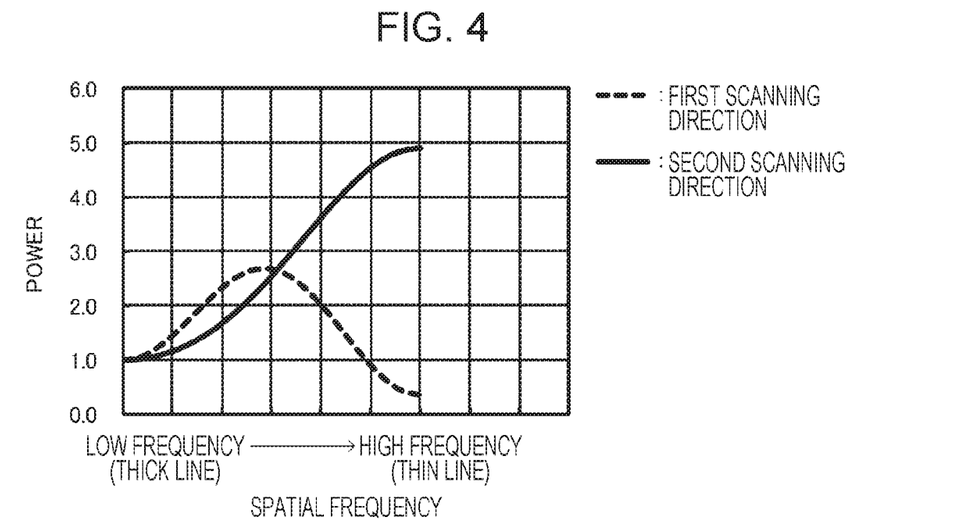
FIG. 4 is a graph that represents spatial frequency characteristics of a first filter of a spatial filtering device of the image processing unit.
Figure 5:
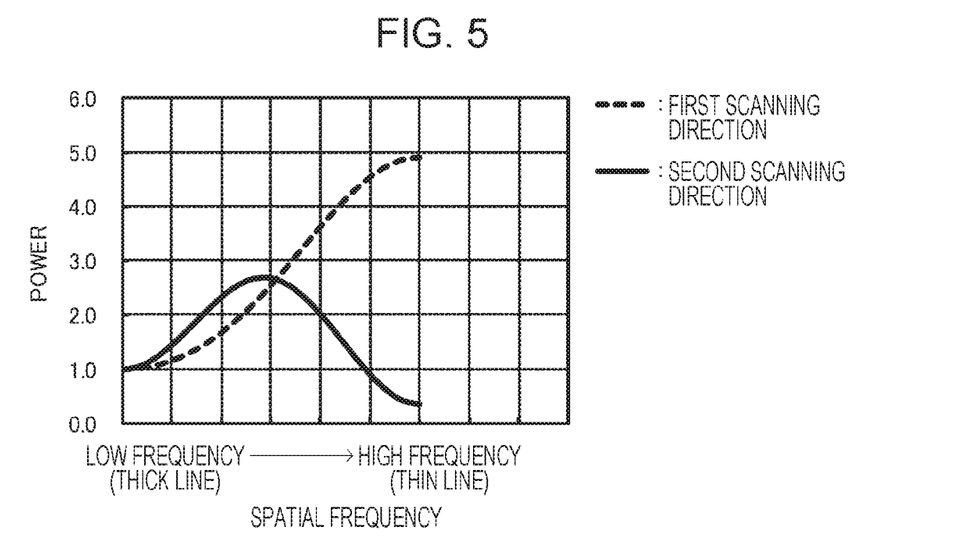
FIG. 5 is a graph that represents spatial frequency characteristics of a second filter of the spatial filtering device of the image processing unit.

The spatial filtering device 27 has a first filter whose characteristics are illustrated in FIG. 4 and a second filter whose characteristics are illustrated in FIG. 5. In FIG. 4 and FIG. 5, power of 1.0 is a reference value. In a case where the power is equal to 1.0 or higher, the higher value indicates the higher effect of the emphasizing process. Power less than 1.0 indicates the smoothing process. The emphasizing process is executed by applying a process that uses the first filter or the second filter to the image data.

Figure 6A:
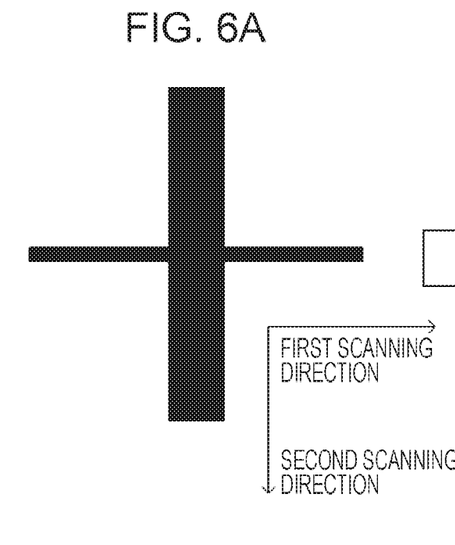
FIG. 6A is a diagram illustrating an example of a manuscript image.
Figure 6B:
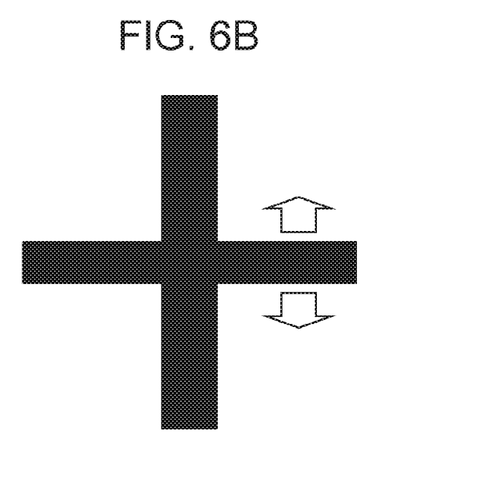
FIG. 6B is a diagram illustrating an example of an image resulting from an emphasizing process of the manuscript image illustrated in FIG. 6A by the first filter.

As illustrated in FIG. 6A and FIG. 6B, the first filter is used in a case where a direction of the thinner line of the vertical line or the horizontal line coincides with the first scanning direction. The first filter has a characteristic that at least in a high frequency region, the widening ratio for thickening the line width of a line in the first scanning direction in a second scanning direction is higher than the widening ratio for thickening the line width of a line in the second scanning direction in the first scanning direction. Further, the first filter has a characteristic of increasing the widening ratio of a line in the first scanning direction as the spatial frequency becomes the higher frequency.

Figure 7A:
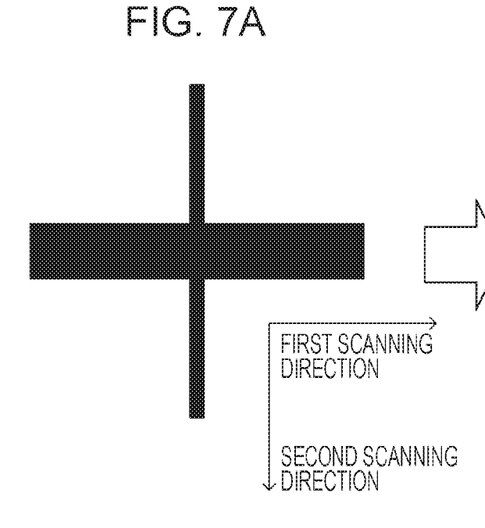
FIG. 7A is a diagram illustrating another example of the manuscript image.
Figure 7B:
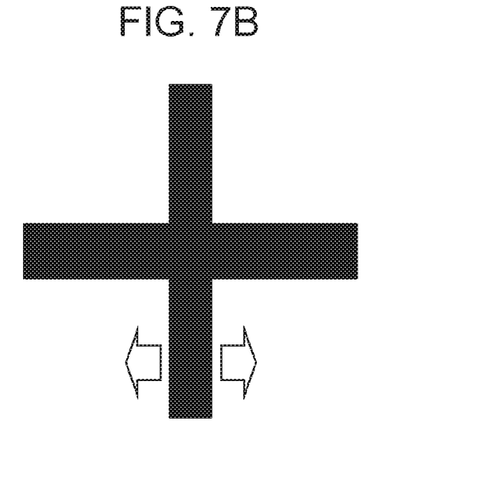
FIG. 7B is a diagram illustrating an example of an image resulting from an emphasizing process of the manuscript image illustrated in FIG. 7A by the second filter.

Meanwhile, as illustrated in FIG. 7A and FIG. 7B, the second filter is used in a case where a direction of the thinner line of the vertical line or the horizontal line coincides with the second scanning direction. The second filter has a characteristic that at least in a high frequency region, the widening ratio for thickening the line width of a line in the second scanning direction in the first scanning direction is higher than the widening ratio for thickening the line width of a line in the first scanning direction in the second scanning direction. Further, the second filter has a characteristic of increasing the widening ratio of a line in the second scanning direction as the spatial frequency becomes the higher frequency.

The image data to which a series of image processes are applied in the image processing unit 12 are output to the image output unit 13 (S7), and an image with high reproducibility is formed on paper.

As described above, in the image processing unit 12, regardless of the orientation of which the manuscript image is set, the thinner line of the vertical line or the horizontal line of the manuscript image is thickened by a higher ratio than the thicker line. Accordingly, the reproducibility of a thin line may be improved while widening of a thick line is restrained.

The processes illustrated in FIG. 2 may also be realized by causing the image processing unit 12 to execute an image processing program. Further, the image processing program that causes the image processing unit 12 to execute the processes illustrated in FIG. 2 may be recorded in a recording medium such as a hard disk or a flash memory in a readable state by the image processing unit 12. As for these two points, the same apply to embodiments that will be described later.

Second Embodiment

The image processing unit 12 according to a second embodiment has a characteristic in a point that the color conversion processor 25 has a function for converting a color manuscript image into a grayscale image and the spatial filtering device 27 executes the emphasizing process in a case where the color conversion processor 25 converts the color manuscript image into the grayscale image and is configured similarly to the image processing unit 12 according to the first embodiment in the other points.

In a case where a color image is converted into a grayscale image, a color with the higher chroma has the lower concentration. Thus, the widening ratio of a thin line is made higher, and the reproducibility of the thin line may thereby be improved while widening of a thick line is restrained.

Third Embodiment

The image processing unit 12 according to a third embodiment has a characteristic in a point that the spatial filtering device 27 executes the emphasizing process in a case where the direction of the thinner line of the vertical line or the horizontal line coincides with the first scanning direction in the image forming unit and is configured similarly to the image processing unit 12 according to the first embodiment in the other points.

The image output unit 13 that includes the developing device of the magnetic brush development scheme naps a part of the developer in an opposing region between the image carrier and the developing device and visualizes the electrostatic latent image as the toner image in a manner such that the surface of the image carrier is rubbed by the napped developer. Thus, a line in the first scanning direction is rubbed by a magnetic brush in the orthogonal direction, the toner that is temporarily attached to the electrostatic latent image is scraped off, and the line in the first scanning direction is thus likely to become thin. Accordingly, in a case where the thinner line of the vertical line or the horizontal line is formed in the first scanning direction in which the thinner line is likely to become much thinner, the emphasizing process is executed, and the reproducibility of a thin line may thereby be improved while widening of a thick line is restrained.

Fourth Embodiment

The image forming apparatus 10 according to a fourth embodiment has a characteristic in the following point. That is, the image input unit 11 has at least one of a copied manuscript mode in which a manuscript formed by copying is scanned to generate the image data and a printed manuscript mode in which a manuscript formed by printing is scanned to generate the image data. The spatial filtering device 27 executes the emphasizing process in a case where the image data are generated by using the copied manuscript mode or the printed manuscript mode in the image input unit 11.

In a case where paper to which copying is made or paper on which printing is made is copied as the manuscript, in a usual mode, a thin line is likely to become much thinner or may disappear. Thus, in the copied manuscript mode and the printed manuscript mode that are used in a case where such a manuscript is copied, the emphasizing process is executed, and the reproducibility of a thin line may thereby be improved while widening of a thick line is restrained.

Note that as the image output unit 13, an ink-jet type printer may be used.

It is to be understood that the descriptions of the above-described embodiments are illustrative in all aspects and do not limit the techniques of the present disclosure. The techniques of the present disclosure are not limited to the above-described embodiments, and various modifications are possible within the scope described by the claims. It is intended that the scope of the present disclosure includes all modifications within the meanings and scope equivalent to the claims. In addition, new embodiments may be configured by mutually combining technical features that are described in the embodiments.

The present disclosure contains subject matter related to that described in Japanese Priority Patent Application JP 2016-169051 filed in the Japan Patent Office on Aug. 31, 2016, the entire contents of which are hereby incorporated by reference.

What is claimed is:

1. An image processing unit comprising:
   an image processor that functions as:
      a line width determination device that detects line widths of a manuscript image in which the line widths are different between a vertical line and a horizontal line and determines which of the vertical line and the horizontal line is thinner; and
      an emphasizing processor that executes an emphasizing process to make a first widening ratio of a thinner line of the vertical line and the horizontal line higher than a second widening ratio of the other line; wherein
   the first widening ratio is a ratio by which the line width of the thinner line of the vertical line and the horizontal line is thickened; and
   the second widening ratio is a ratio by which the line width of the other line is thickened.

2. The image processing unit according to claim 1, wherein the emphasizing processor executes the emphasizing process in a case where the line width of the thinner line of the vertical line and the horizontal line is equal to or smaller than a prescribed value.

3. The image processing unit according to claim 2, wherein the prescribed value corresponds to a line width of three pixels when a resolution of the manuscript image is 600 dpi.

4. The image processing unit according to claim 1, wherein:
   the image processor functions as a color conversion processor that converts a color manuscript image into a grayscale image; and
   the emphasizing processor executes the emphasizing process in a case where the color conversion processor converts the color manuscript image into the grayscale image.

5. The image processing unit according to claim 1, wherein the manuscript image includes a character.

6. The image processing unit according to claim 1, wherein the manuscript image includes a ruled line.

7. An image forming apparatus comprising:
   a scanner that has at least one of a copied manuscript mode in which a manuscript formed by copying is scanned to generate image data and a printed manuscript mode in which a manuscript formed by printing is scanned to generate image data;
   an image processor that functions as:
      a line width determination device that detects line widths of a manuscript image in which the line widths are different between a vertical line and a horizontal line and determines which of the vertical line and the horizontal line is thinner; and
      an emphasizing processor that executes an emphasizing process to make a first widening ratio of a thinner line of the vertical line and the horizontal line higher than a second widening ratio of the other line, the emphasizing processor executing the emphasizing process for the image data generated by the scanner; and
   a printer that forms an image on paper based on the image data output from the emphasizing processor; wherein
   the first widening ratio is a ratio by which the line width of the thinner line of the vertical line and the horizontal line is thickened;

the second widening ratio is a ratio by which the line width of the other line is thickened; and the emphasizing processor executes the emphasizing process in a case where the image data is generated by using the copied manuscript mode or the printed manuscript mode in the scanner.

8. An image processing method comprising:

detecting line widths of a manuscript image in which the line widths are different between a vertical line and a horizontal line using an image processor;

determining which of the vertical line and the horizontal line is thinner using the image processor; and executing an emphasizing process to make a first widening ratio of a thinner line of the vertical line and the horizontal line higher than a second widening ratio of the other line using the image processor; wherein the first widening ratio is a ratio by which the line width of the thinner line of the vertical line and the horizontal line is thickened; and the second widening ratio is a ratio by which the line width of the other line is thickened.

\* \* \* \* \*